US009170444B2

(12) United States Patent
Dai

(10) Patent No.: US 9,170,444 B2
(45) Date of Patent: Oct. 27, 2015

(54) LIQUID CRYSTAL DISPLAY ASSEMBLY

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Bin Dai, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 196 days.

(21) Appl. No.: 13/713,486

(22) Filed: Dec. 13, 2012

(65) Prior Publication Data

US 2013/0222984 A1 Aug. 29, 2013

(30) Foreign Application Priority Data

Feb. 27, 2012 (CN) .......................... 2012 1 0045267

(51) Int. Cl.
*G06F 1/16* (2006.01)
*G02F 1/1333* (2006.01)

(52) U.S. Cl.
CPC ........ *G02F 1/1333* (2013.01); *G02F 1/133308* (2013.01); *G06F 1/16* (2013.01); *G06F 1/1601* (2013.01); *G02F 2001/13332* (2013.01); *G02F 2001/133314* (2013.01); *G02F 2201/46* (2013.01)

(58) Field of Classification Search
CPC .................................. G06F 1/16; G06F 1/1601
USPC ............................ 361/679.21; 349/56, 58, 60
See application file for complete search history.

(56) References Cited

U.S. PATENT DOCUMENTS

| 7,965,498 | B2* | 6/2011 | Gotham et al. | 361/679.21 |
| 7,983,028 | B2* | 7/2011 | Park et al. | 361/679.21 |
| 8,243,429 | B2* | 8/2012 | Zadesky et al. | 361/679.21 |
| 2009/0180247 | A1* | 7/2009 | Park et al. | 361/679.21 |
| 2014/0085796 | A1* | 3/2014 | Mathew et al. | 361/679.21 |

* cited by examiner

*Primary Examiner* — Anthony Haughton
(74) *Attorney, Agent, or Firm* — Novak Druce Connolly Bove + Quigg LLP

(57) ABSTRACT

A liquid crystal display assembly includes a housing, a reinforcing frame, at least one magnetic member, and a display. The reinforcing frame is mounted on the housing. the reinforcing frame includes a latching hole and an elastic sheet adjacent to the latching hole. A magnet block is mounted on the elastic sheet. At least one magnetic member is positioned on the reinforcing frame. The display includes a magnetic attracting frame, and the magnetic attracting frame includes a latching post extending through the latching hole, and latched with the elastic sheet. The magnetic attracting frame is magnetically attracted with the at least one magnetic member for attaching the display on the reinforcing frame.

12 Claims, 11 Drawing Sheets

LIQUID CRYSTAL DISPLAY ASSEMBLY

BACKGROUND

1. Technical Field

The present disclosure relates to liquid crystal display assemblies, particularly to a liquid crystal display assembly configured for an electronic device.

2. Description of Related Art

Liquid crystal display assembly usually includes a housing and a reinforcing frame fixed with the housing. A display is connected with the reinforcing frame via a glue, and is attached on the housing. However, the glue is volatile and subjected to aging, thus the glue may lose its adhesiveness, which may result in the display to be disconnecting from the housing. In additional, it may be difficult for the display being disengaged from the reinforcing frame.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
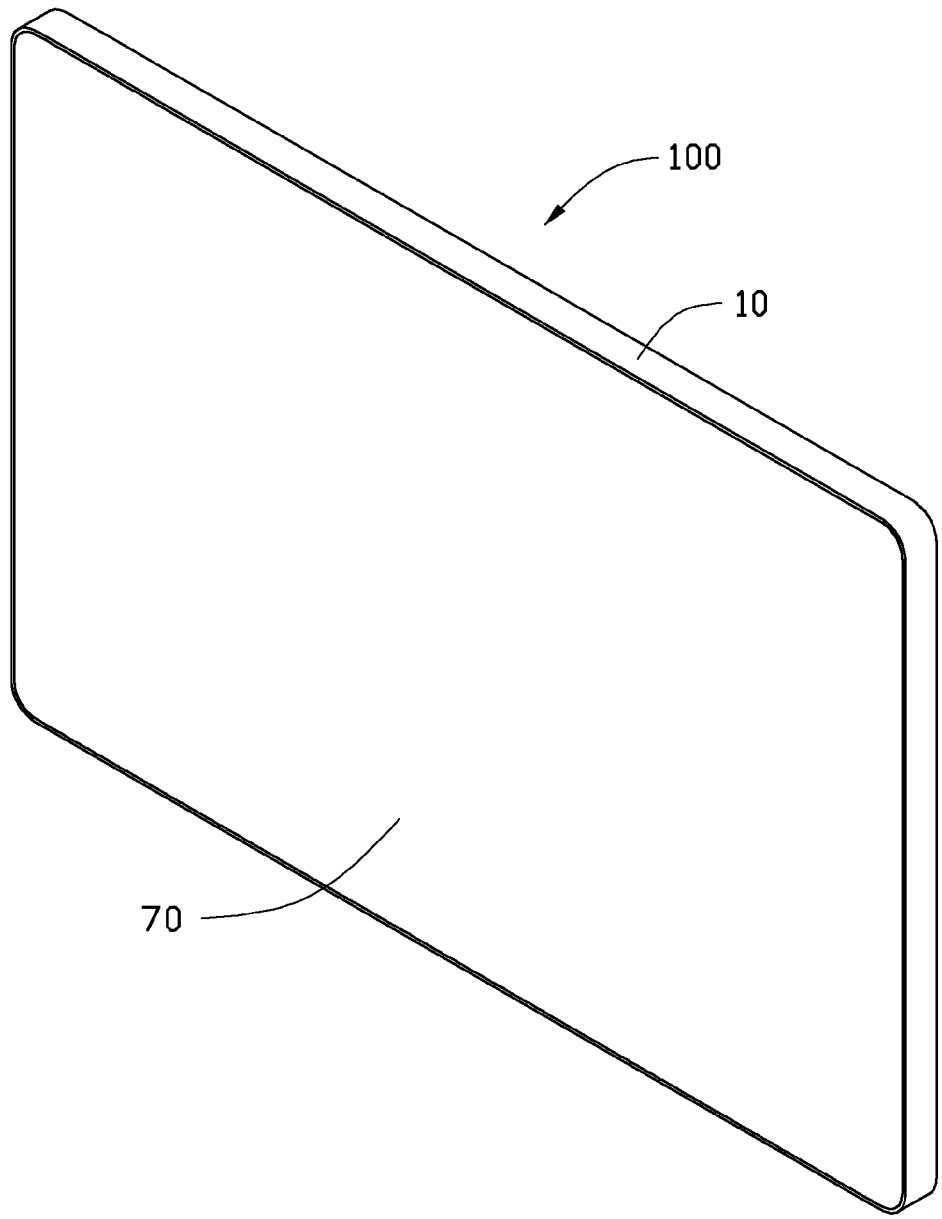
FIG. 1 is an isometric view of an embodiment of a liquid crystal display assembly.
Figure 2:
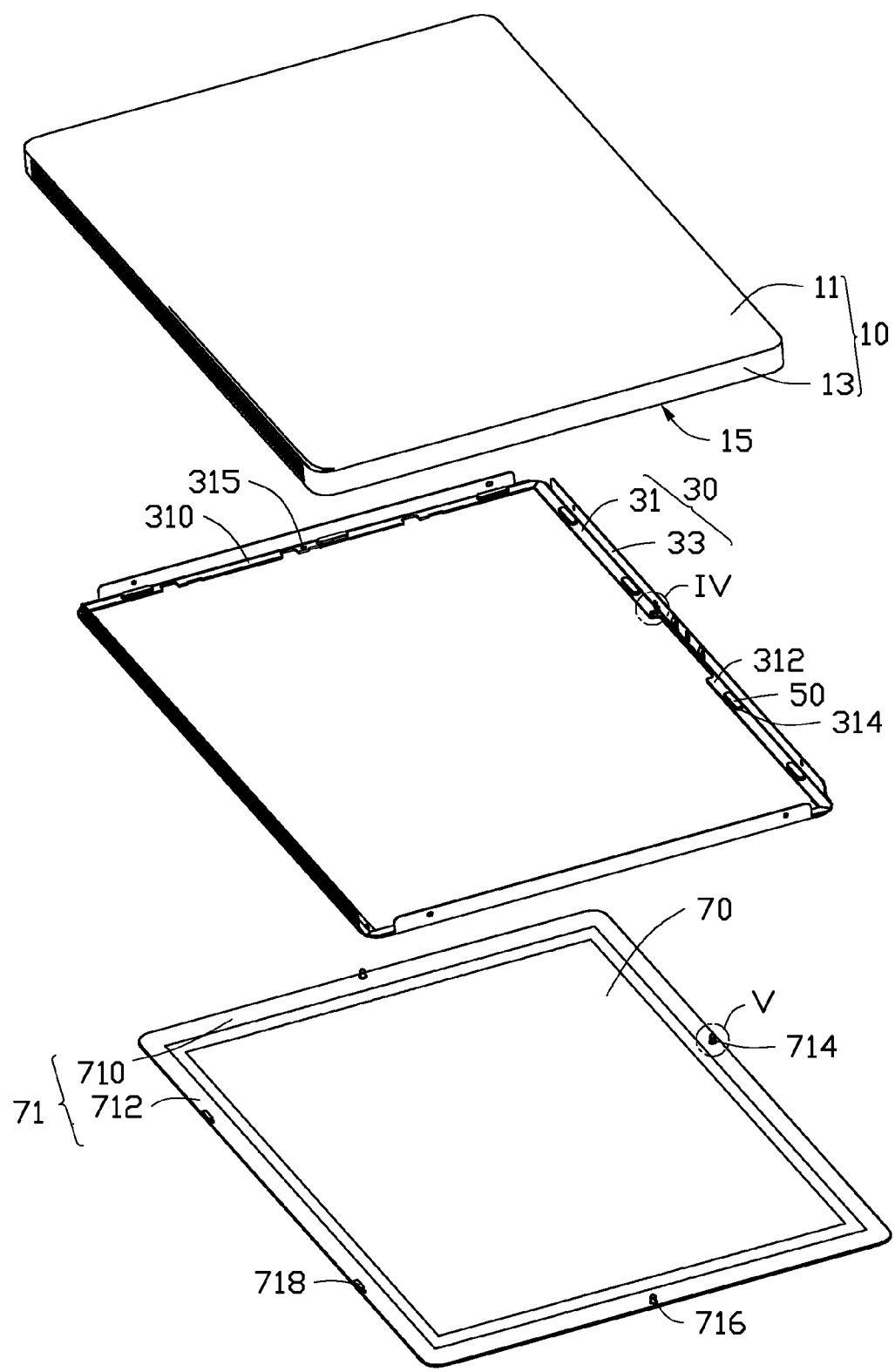
FIG. 2 is an exploded, isometric view of the liquid crystal display assembly shown in FIG. 1, which includes a housing, a reinforcing frame, a plurality of magnetic members, and a display.

FIGS. 1 and 2 show an embodiment of a liquid crystal display assembly 100. The liquid crystal display assembly 100 may be used in a tablet PC, a desktop computer, a mobile phone, an MP3 player, a PDA, a digital camera and so on. In the illustrated embodiment, the liquid crystal display assembly 100 is used in a desktop computer (not shown). The liquid crystal display assembly 100 includes a housing 10, a reinforcing frame 30, a plurality of magnetic members 50, and a display 70. The reinforcing frame 30 is positioned on the housing 10. The plurality of magnetic members 50 are mounted on the reinforcing frame 30. The display 70 is attached on the housing 10 with the reinforcing frame 30. In the illustrated embodiment, the housing 10 and the reinforcing frame 30 are manufactured by metal punching.

The housing 10 includes a base plate 11, and a plurality of sidewalls 13 perpendicularly extending from edges of the base plate 11. In the exemplary embodiment, the base plate 11 is substantially rectangular, and there are four sidewalls 13 connected to the base plate 11. In other embodiments, the base plate 11 may be other shapes, such as triangle, for example, and the four sidewalls 13 may be changed to three sidewalls accordingly. The sidewalls 13 and the base plate 11 cooperatively define a receiving chamber 15 for receiving the reinforcing frame 30 and other functional modules (not shown) of the liquid crystal display assembly 100. In the exemplary embodiment, the housing 10 is made of metal. Note that as used herein, the phrase "made of metal" may mean or include a non-metallic material coated with a metallic (magnetic) material.

Figure 3:
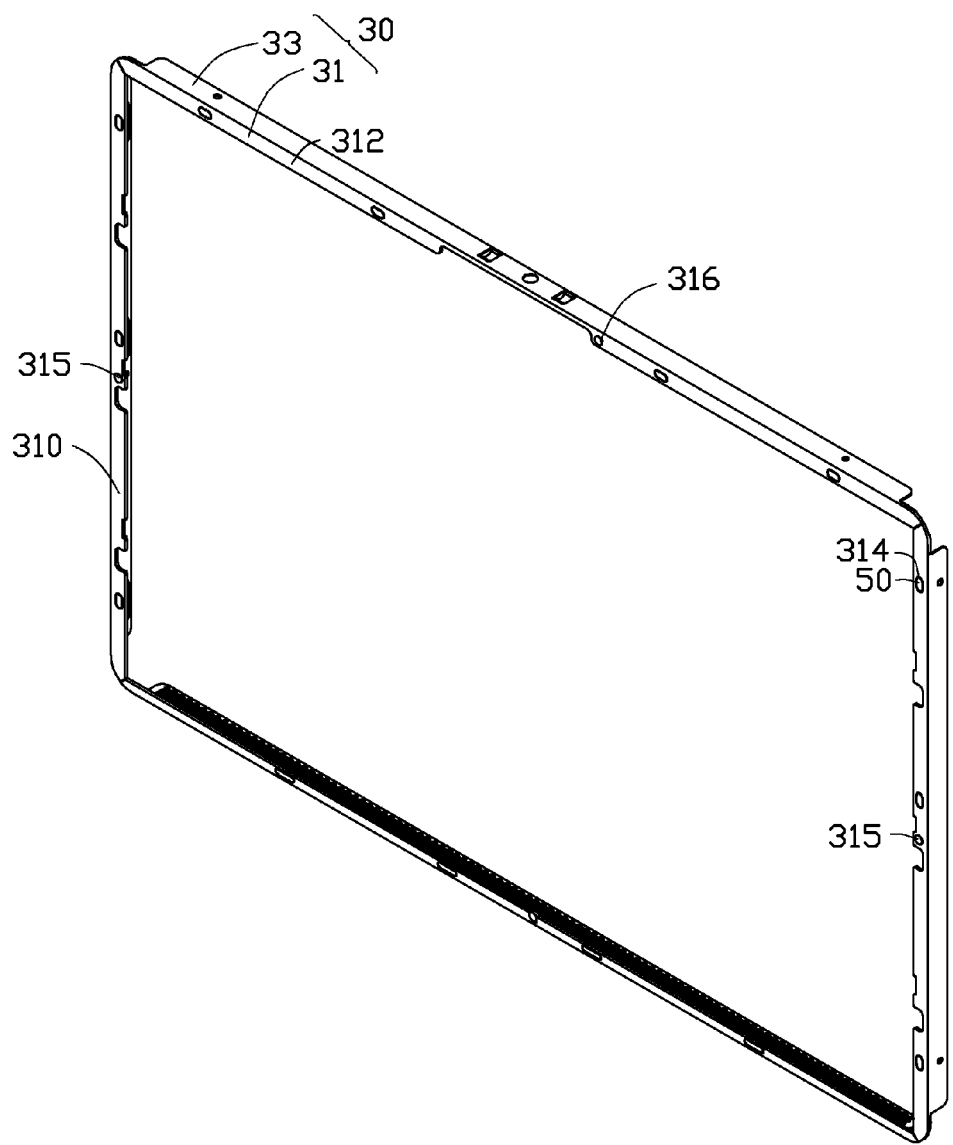
FIG. 3 is an enlarged, isometric view of the reinforcing frame with the plurality of magnetic members shown in FIG. 2.

Referring to FIG. 3, the reinforcing frame 30 is substantially rectangular corresponding to the housing 10. The reinforcing frame 30 includes a support portion 31, and four flanges 33 perpendicularly bending from four sides of the support portion 31, outwardly. The support portion 31 includes two opposite first edges 310 and two opposite second edges 312. A plurality of through holes 314 are defined in the first edges 310 and the second edges 312, and are configured for mounting the magnetic members 50. In the illustrated embodiment, there are fourteen through holes 314, for mounting the magnetic members 50. Each first edge 310 of the support portion 31 defines three through holes 314 arranged apart, and each second edge 312 of the support portion 31 defines four through holes 314 arranged apart. A positioning hole 315 is defined at each first edge 310, respectively. Each positioning hole 315 is located at a substantially middle portion of one corresponding first edge 310. A latching hole 316 is defined at one of the second edges 312.

Figure 4:
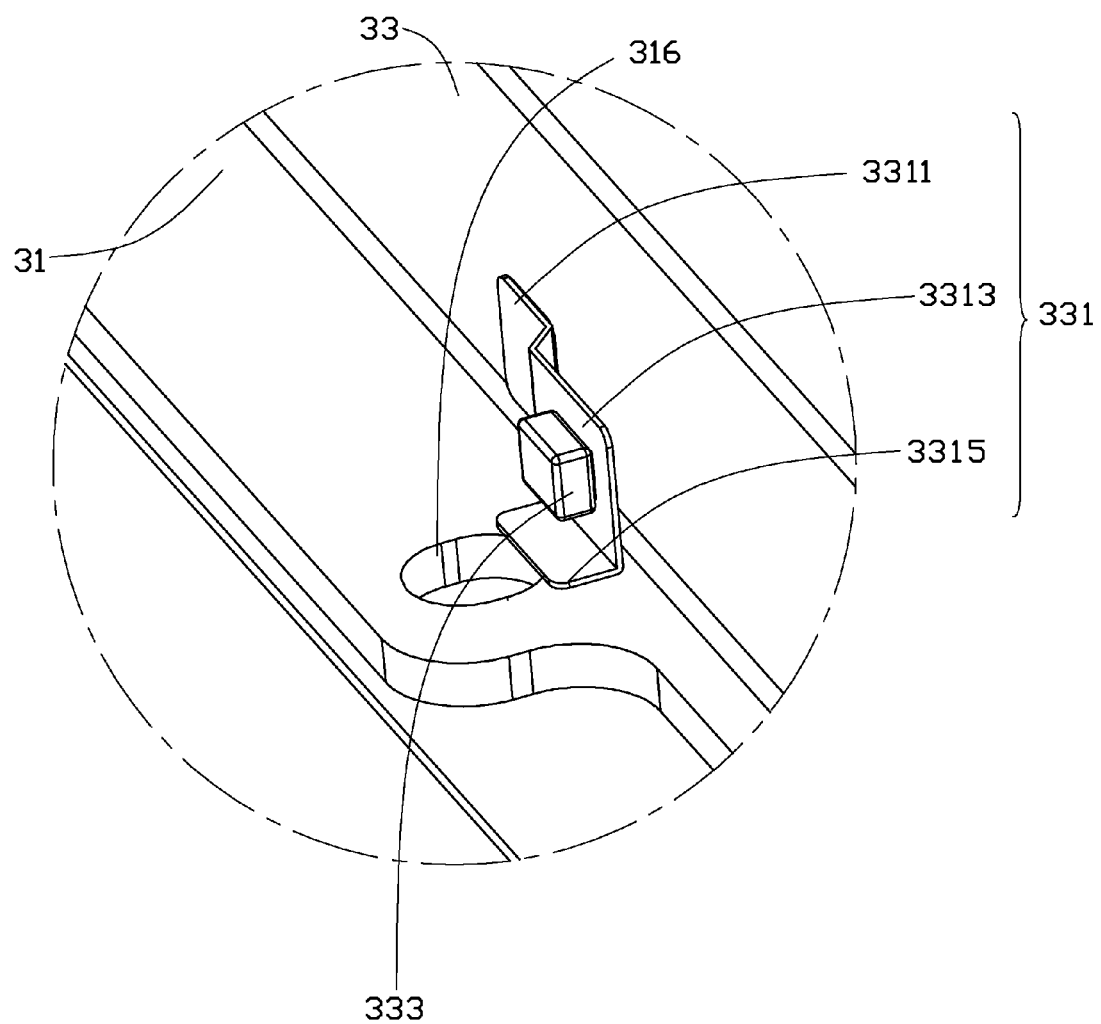
FIG. 4 is an enlarged view of a circled portion IV of FIG. 2.

Referring to FIG. 4, the flanges 33 are received in the receiving chamber 15 of the housing 10, and abut against the sidewalls 13. A height of the flanges 33 is less than a height of the sidewalls 13, so that the reinforcing frame 30 can be contained in the receiving chamber 15. In the illustrated embodiment, the flanges 33 are attached to the sidewalls 13 via welding. In other embodiments, the housing 10 may be fixed to the reinforcing frame 30 via other ways, such as pasting, latching, riveting, and so on. An elastic sheet 331 is formed on the flange 33, and is positioned besides the latching hole 316. The elastic sheet 331 includes a base body 3311, a mounting portion 3313, and a latching portion 3315 integrally formed together. The base body 3311 is fixed on a side of one of the flanges 33 adjacent to the latching hole 316. The mounting portion 3313 extends from the base body 3311, and is substantially L-shaped. The mounting portion 3313 is spaced from the corresponding flange 33. The latching portion 3315 substantially perpendicularly extends from a bottom side of the mounting portion 3313 away from the corresponding flange 33, and is above the support portion 31. A magnet block 333 is mounted on a surface of the mounting portion 3313 away from the corresponding flange 33.

The plurality of magnetic members 50 are located within the through holes 314 of the support portion 31. In the illustrated embodiment, the magnetic members 50 are magnets.

Figure 5:
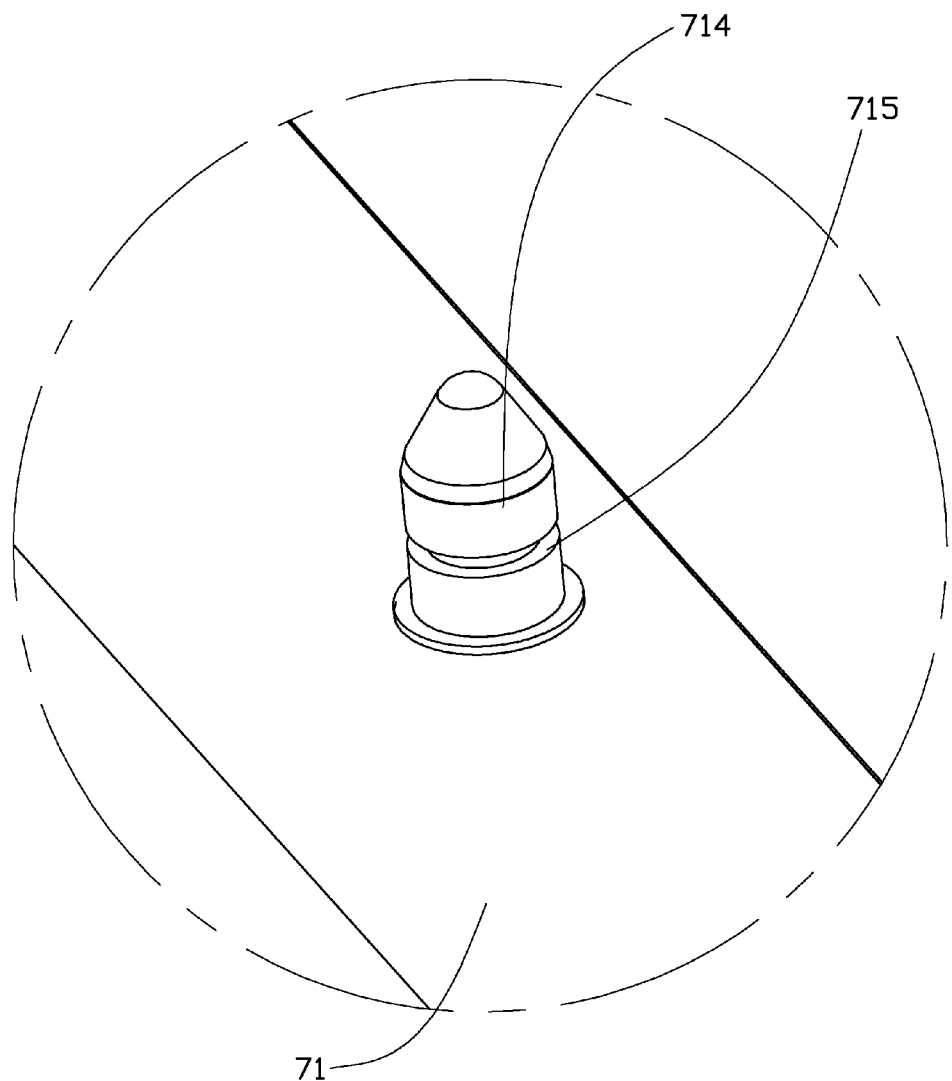
FIG. 5 is an enlarged view of a circled portion V of FIG. 2.
Figure 6:
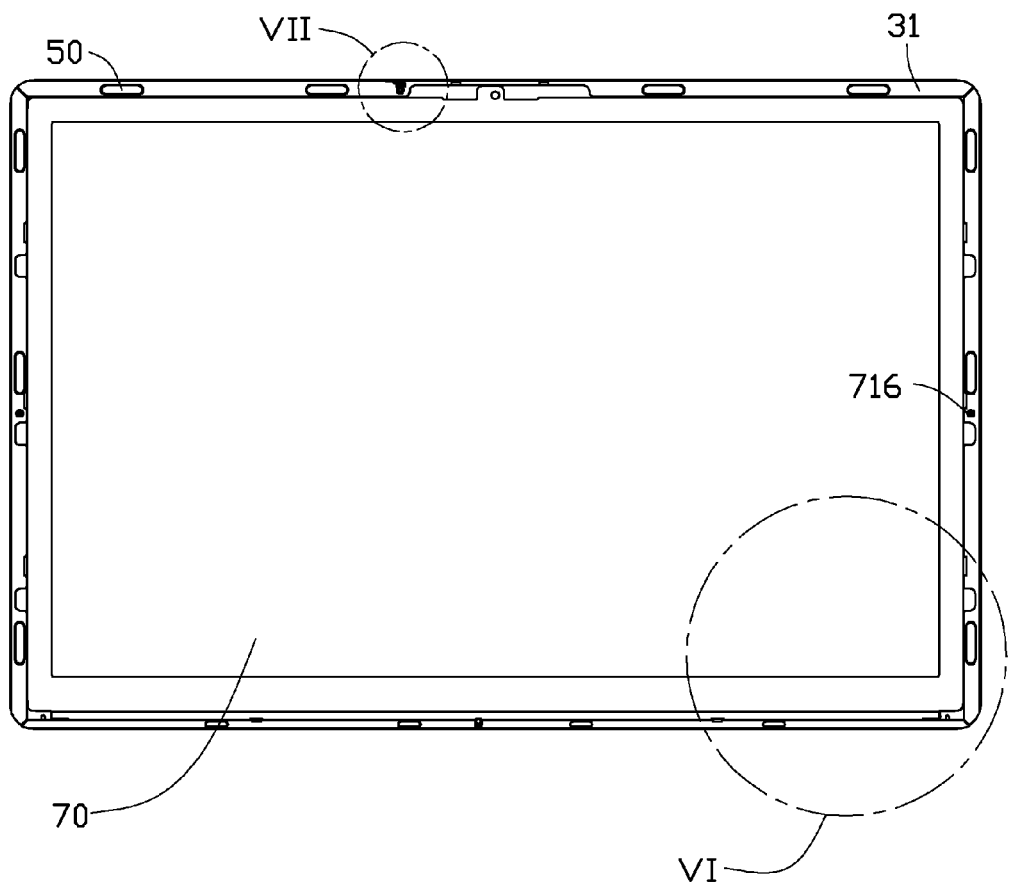
FIG. 6 is an isometric view of the reinforcing frame, the magnetic members, and the display assembled together shown in FIG. 2.
Figure 7:
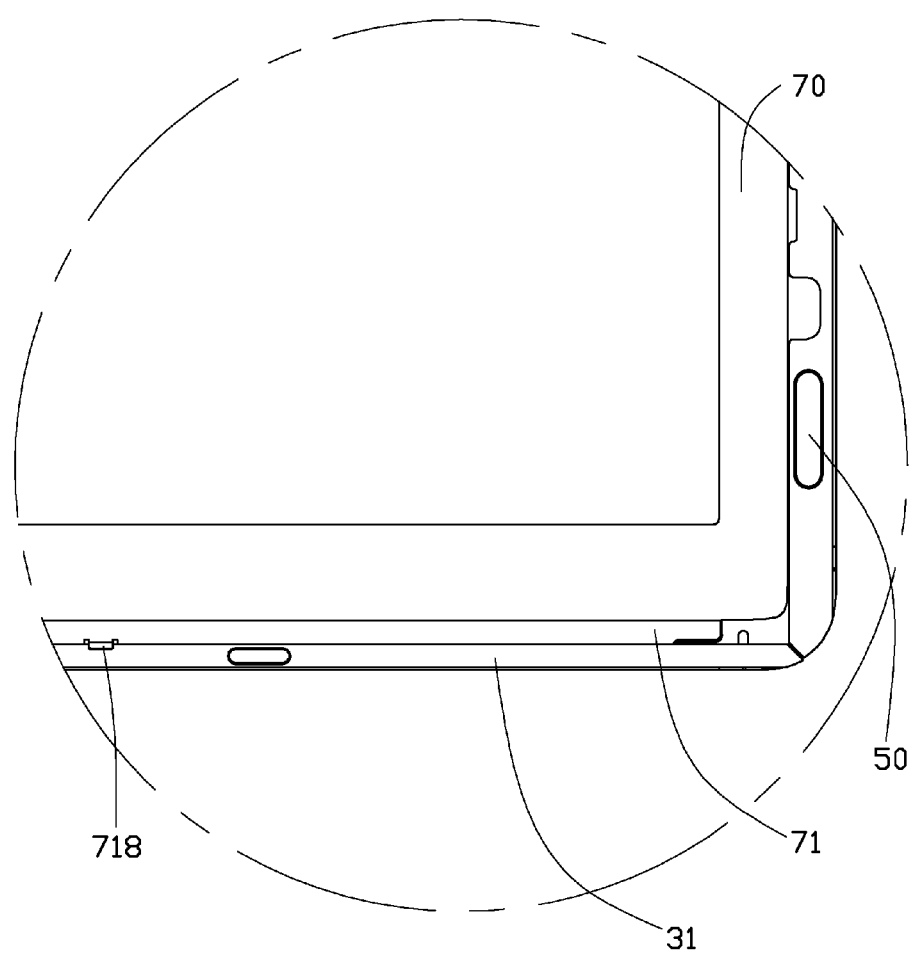
FIG. 7 is an enlarged view of a circled portion VII of FIG. 6.
Figure 8:
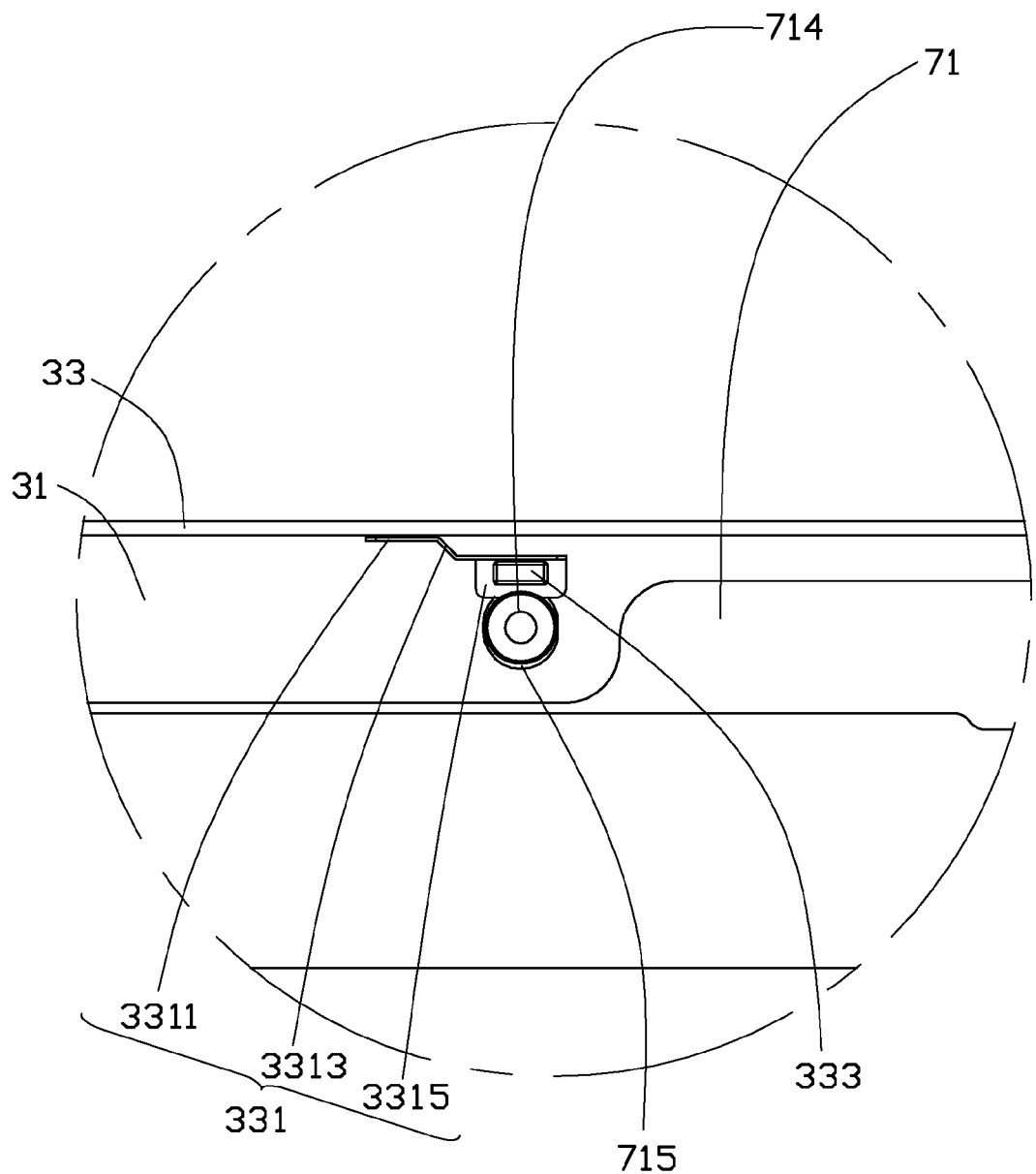
FIG. 8 is an enlarged view of a circled portion VIII of FIG. 6.
Figure 9:
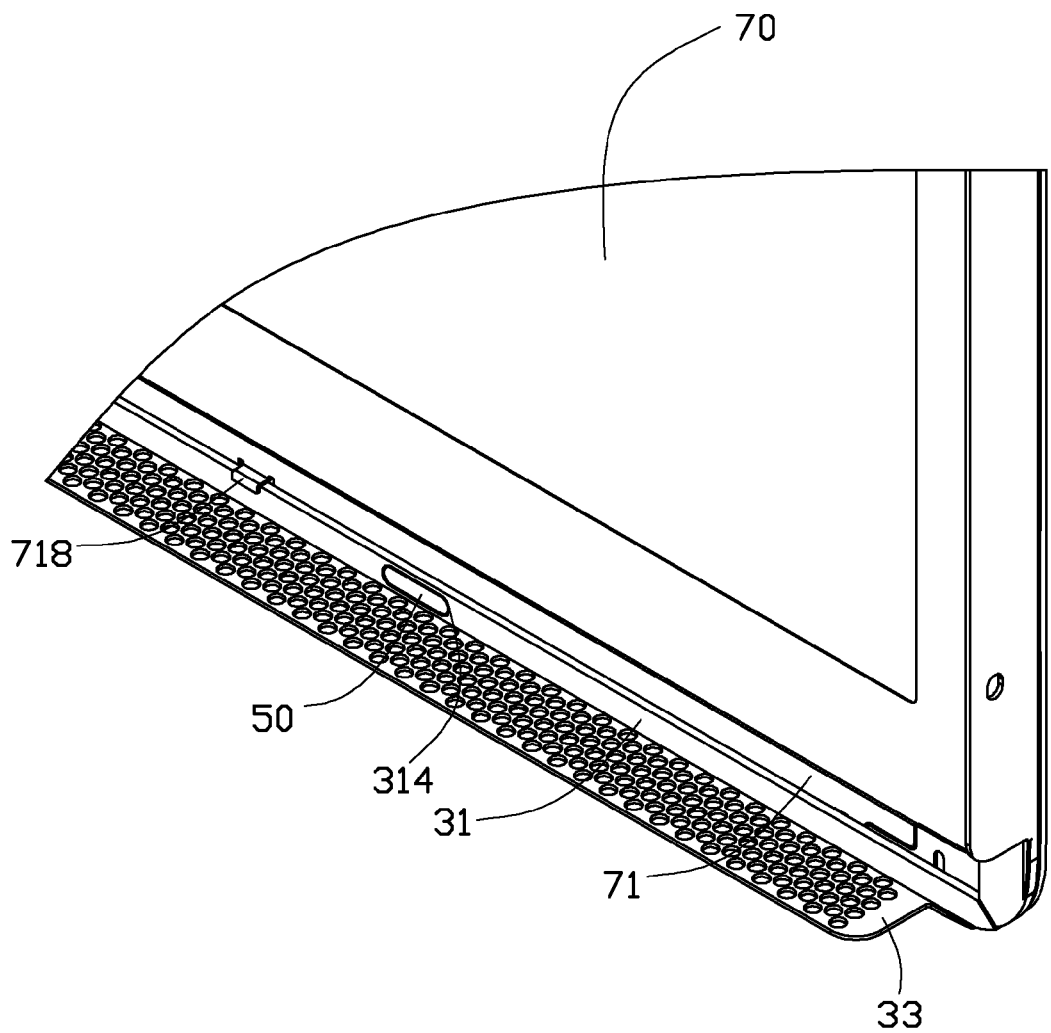
FIG. 9 is a partial, isometric view of the liquid crystal display assembly of FIG. 4.
Figure 10:
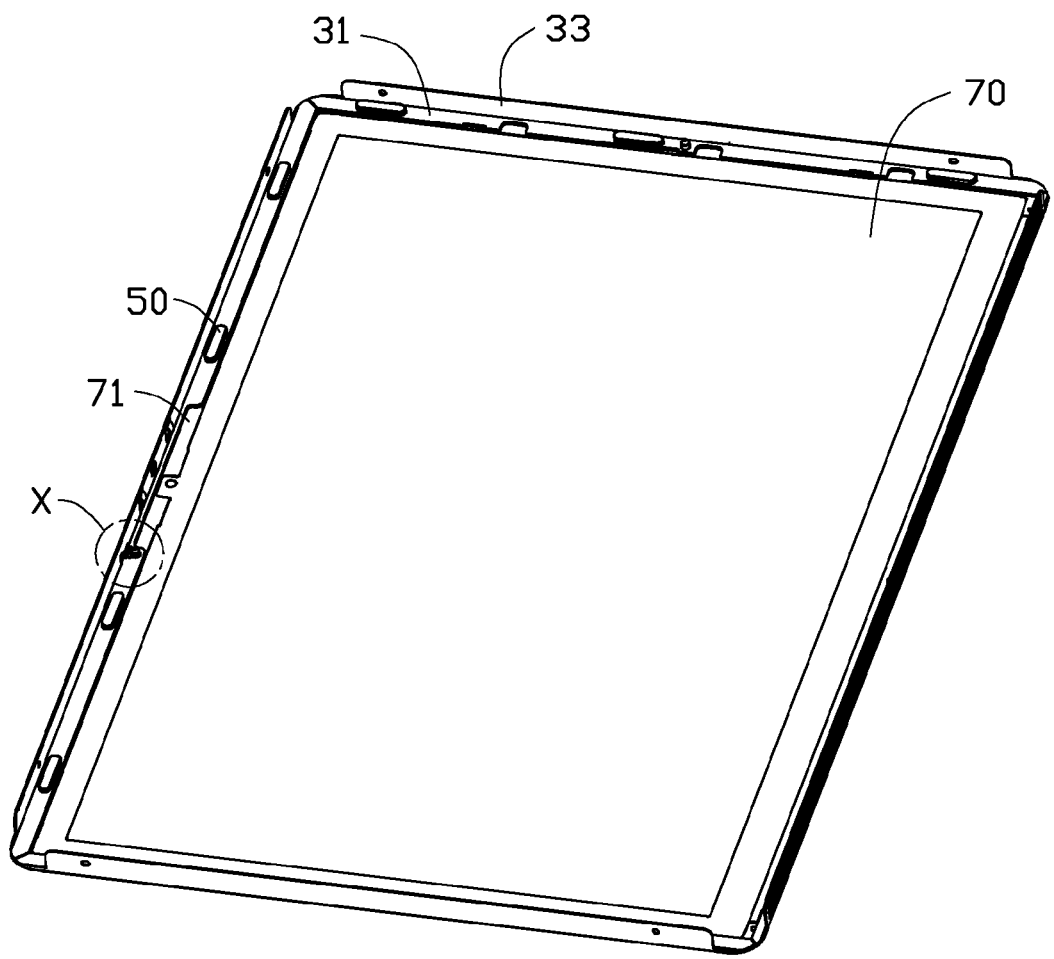
FIG. 10 is similar to FIG. 6, but viewed from another aspect.
Figure 11:
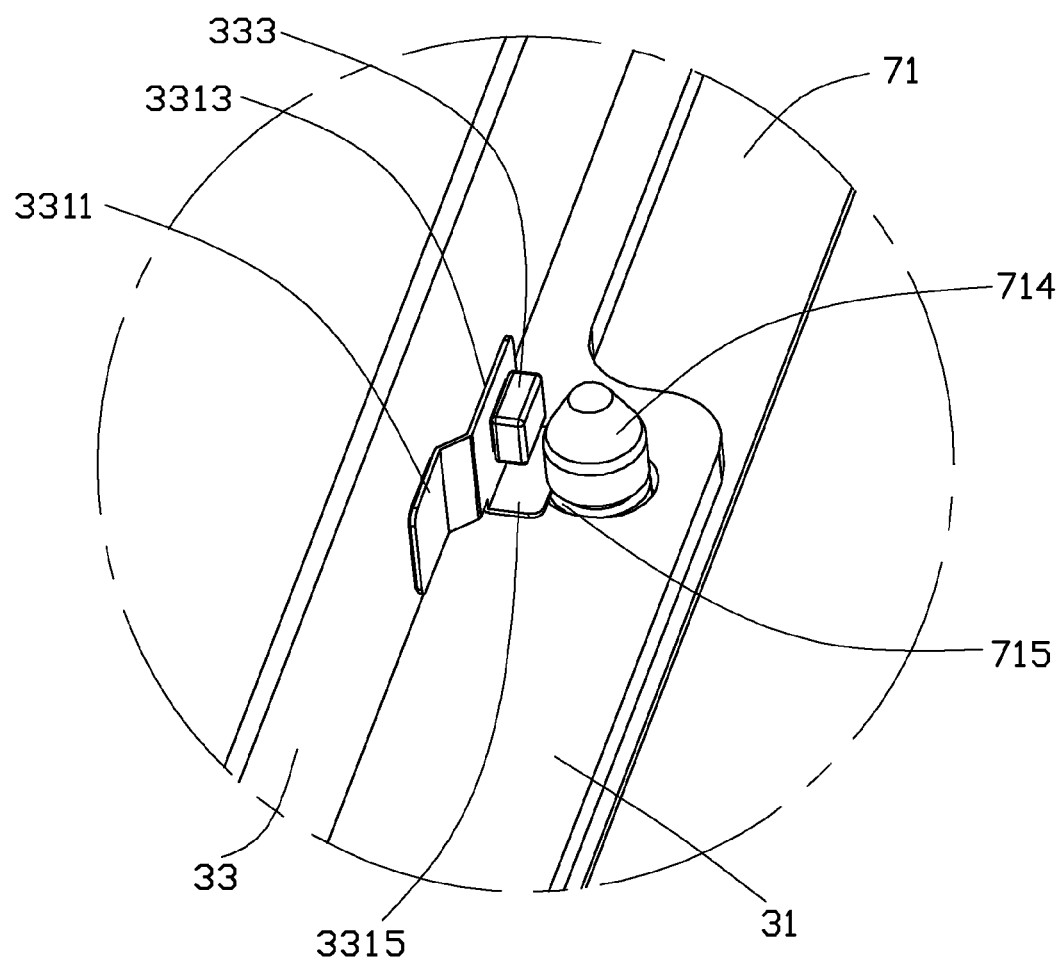
FIG. 11 is an enlarged view of a circled portion XI of FIG. 10.

Referring to FIGS. 2 and 5, the display 70 includes a magnetic attracting frame 71 at a periphery thereof corresponding to the support portion 31 of the reinforcing frame 30. The magnetic attracting frame 71 is made of metal materials, for achieving a magnetic attraction with the magnetic members 50. In the illustrated embodiment, the magnetic attracting frame 71 is made of iron. The magnetic attracting frame 71 includes two first sides 710 corresponding to the first edges 310 and two second sides 712 corresponding to the second edges 312, in which the two first sides 710 are oppositely located to each other, and the two second sides 712 are oppositely located to each other. A latching post 714 protrudes from one of the second sides 712 corresponding to the latching hole 316, and is configured to pass through the latching hole 316 and to be latched with the latching portion 3315 as shown in FIG. 11. The latching post 714 has a cylindrical body and a conical free end extending from the cylindrical body. An annular latching groove 715 is defined at the cylindrical body of the latching post 714, for latching with the latching portion 3315. A positioning post 716 perpendicularly protrudes from a substantially middle portion of each first sides 710, and is configured to pass through one corresponding positioning hole 315, respectively. Two spaced L-shaped hooks 718 are integrally formed on one of the second sides 712 of the magnetic attracting frame 71 and are configured to be latched with the corresponding second edge 312 of the support portion 31. In other embodiments, the number of the hooks 718 may be one, three, or more than three.

Referring to FIGS. 6 to 11, in assembly of the liquid crystal display assembly 100, the reinforcing frame 30 is received in the housing 10. The flange 33 is fixed to the sidewall 13 of the housing 10, and the reinforcing frame 30 is received in the receiving chamber 15. Then, the display 70 is attached to the reinforcing frame 30. The magnetic attracting frame 71 of the display 70 is attracted on the support portion 31 by the magnetic members 50 of the reinforcing frame 30. The positioning posts 716 pass through the corresponding positioning holes 315, for positioning the display 70 to the reinforcing frame 30. The latching post 714 passes through the latching hole 316 and latches with the latching portion 3315. The hooks 718 grasp the support portion 31 of the reinforcing frame 30. Therefore, the housing 10, the reinforcing frame 30, and the display 70 are assembled together.

In disassembly of the liquid crystal display assembly 100, a magnet tool (not shown) is positioned at a side of the liquid crystal display assembly 100 adjacent to the magnet block 333. The magnet block 333 is magnetically attracted by the magnet tool, which enable the mounting portion 3313 to be deformed and to move toward the corresponding flange 33, thus the latching portion 3315 is disengaged from the latching groove 715. Therefore, the display 70 is capable of easily detaching away from the reinforcing frame 30. As a result, it is easy to assemble and disassemble the liquid crystal display assembly 100.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A liquid crystal display assembly, comprising:
   a housing;
   a reinforcing frame mounted on the housing, the reinforcing frame comprising a latching hole and an elastic sheet adjacent to the latching hole, the elastic sheet comprising a latching portion, a base body and a mounting portion, the latching post defining a latching groove, the base body mounted to the reinforcing frame, the mounting portion bending from the base body, the latching portion bending from the mounting portion towards the latching post, a magnet block mounted on the mounting portion of the elastic sheet;
   at least one magnetic member positioned on the reinforcing frame; and
   a display comprising a magnetic attracting frame, the magnetic attracting frame comprising a latching post extending through the latching hole, and latched with the elastic sheet, the magnetic attracting frame being magnetically attracted by the at least one magnetic member for attaching the display on the reinforcing frame.

2. The liquid crystal display assembly of claim 1, wherein at least one hook protrudes from the magnetic attracting frame, and the at least one hook is latched with the reinforcing frame.

3. The liquid crystal display assembly of claim 1, wherein at least one positioning post protrudes from the magnetic attracting frame, the reinforcing frame defines at least one positioning hole corresponding to the at least one positioning post, the at least one positioning post is inserted into the at least one positioning hole, for positioning the display to the reinforcing frame.

4. The liquid crystal display assembly of claim 1, wherein the reinforcing frame comprises a support portion and at least one flange perpendicularly extending from the support portion towards the housing, the at least one flange is attached to the housing, the latching hole is defined at the support portion, the latching post passes through the support portion, the base body is attached to the at least one flange.

5. The liquid crystal display assembly of claim 4, wherein the support portion defines at least one through hole, the at least one magnetic member is mounted in the at least one through hole.

6. The liquid crystal display assembly of claim 4, wherein the housing comprises a base plate and at least one sidewall outwardly extending from the base plate, the base plate defines a receiving chamber cooperative with the sidewalls, the reinforcing frame is received in the receiving chamber, and the at least one flange is attached to the at least one sidewall.

7. An liquid crystal display assembly, comprising:
   a housing;
   a reinforcing frame mounted on the housing, the reinforcing frame comprising a latching hole and an elastic sheet adjacent to the latching hole, the elastic sheet comprising a latching portion, a base body and a mounting portion, the latching post defining a latching groove, the base body mounted to the reinforcing frame, the mounting portion bending from the base body outwardly, the latching portion bending from the mounting portion, a magnet block mounted on the mounting portion of the elastic sheet; and
   a display comprising a magnetic attracting frame, the magnetic attracting frame comprising a latching post extending through the latching hole, and latched with the latching groove of the elastic sheet, at least one hook protruding from the magnetic attracting frame, and latched with the reinforce frame.

8. The liquid crystal display assembly of claim 7, wherein the liquid crystal display assembly further comprise at least one magnetic member mounted on the reinforcing frame, the magnetic attracting frame is magnetically attracted by the at least one magnetic member for attaching the display on the reinforcing frame.

9. The liquid crystal display assembly of claim 7, wherein the magnetic attracting frame further comprises at least one positioning post protruding from the magnetic attracting frame, the reinforcing frame defines at least one positioning hole corresponding to the at least one positioning post, the at least one positioning post is inserted into the at least one positioning hole, for positioning the display to the reinforcing frame.

10. The liquid crystal display assembly of claim 9, wherein the reinforcing frame comprises a support portion and at least one flange perpendicularly extending from the support portion towards the housing, the at least one flange is attached to the housing, the latching hole is defined at the support portion, the latching post passes through the support portion, and is latched with the latching portion, the base body is attached to the at least one flange.

11. The liquid crystal display assembly of claim 10, wherein the support portion defines at least one through hole, at least one magnetic member is mounted in the at least one through hole.

12. The liquid crystal display assembly of claim 10, wherein the housing comprises a base plate and at least one sidewall outwardly extending from the base plate, the base plate defines a receiving chamber cooperative with the sidewalls, the reinforcing frame is received in the receiving chamber, and the at least one flange is attached to the corresponding at least one sidewall.

\* \* \* \* \*